May 2, 1939.  J. J. RAY  2,157,058
EDUCATIONAL DEVICE
Filed Sept. 2, 1937   5 Sheets-Sheet 1
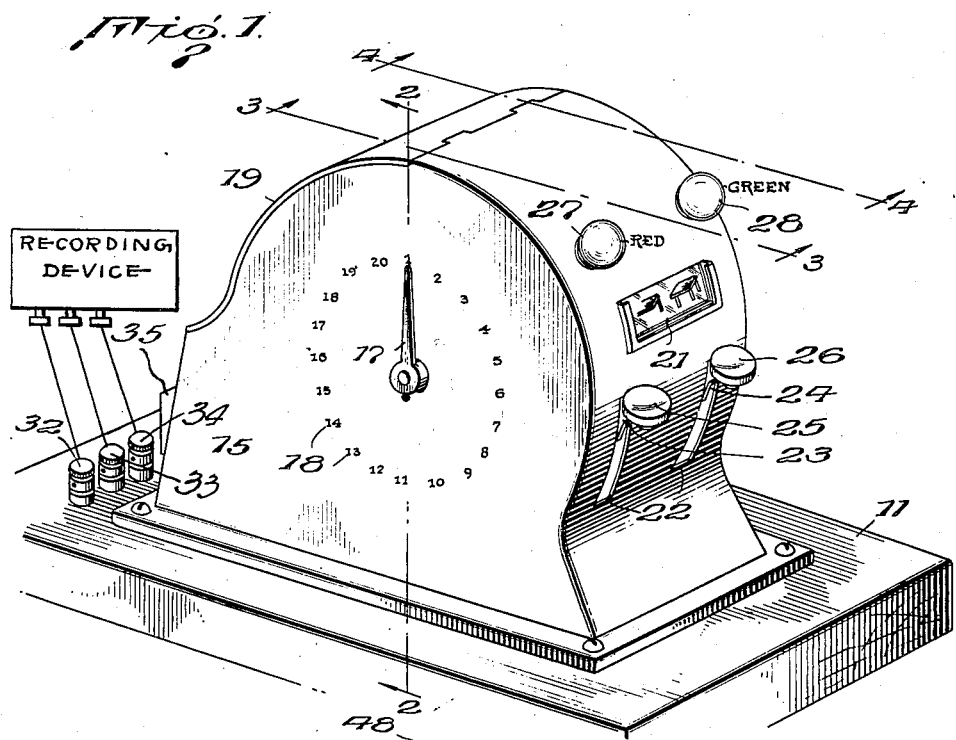
Inventor
Joseph J. Ray,
By Church & Church
His Attorneys May 2, 1939.  J. J. RAY  2,157,058
EDUCATIONAL DEVICE
Filed Sept. 2, 1937  5 Sheets-Sheet 2

Inventor
Joseph J. Ray,
By Church & Church
His Attorneys

May 2, 1939. J. J. RAY 2,157,058
EDUCATIONAL DEVICE
Filed Sept. 2, 1937 5 Sheets-Sheet 3
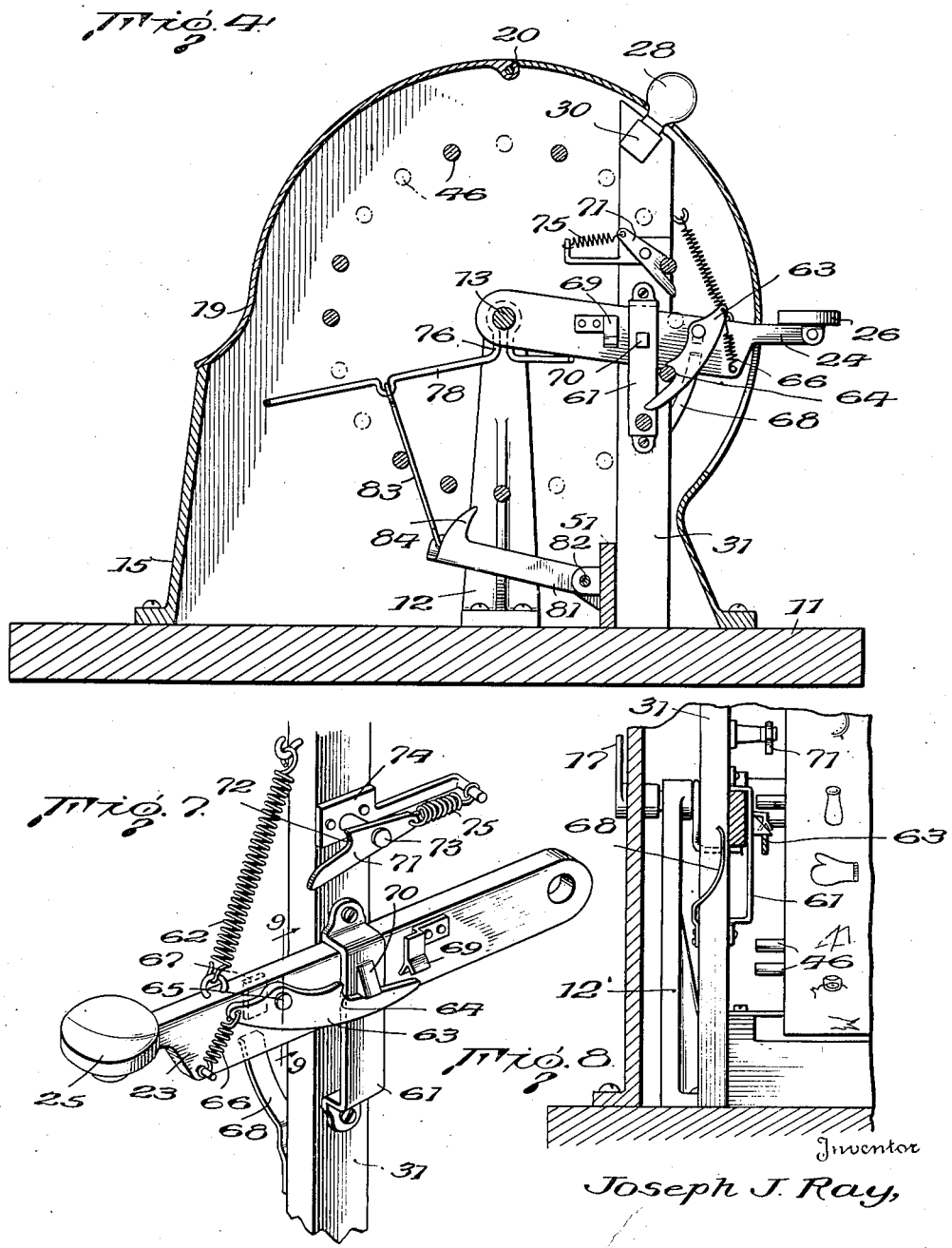
Inventor
Joseph J. Ray,
By Church & Church
His Attorneys May 2, 1939.   J. J. RAY   2,157,058
EDUCATIONAL DEVICE
Filed Sept. 2, 1937   5 Sheets-Sheet 4

Inventor
Joseph J. Ray,
By Church & Church
His Attorneys

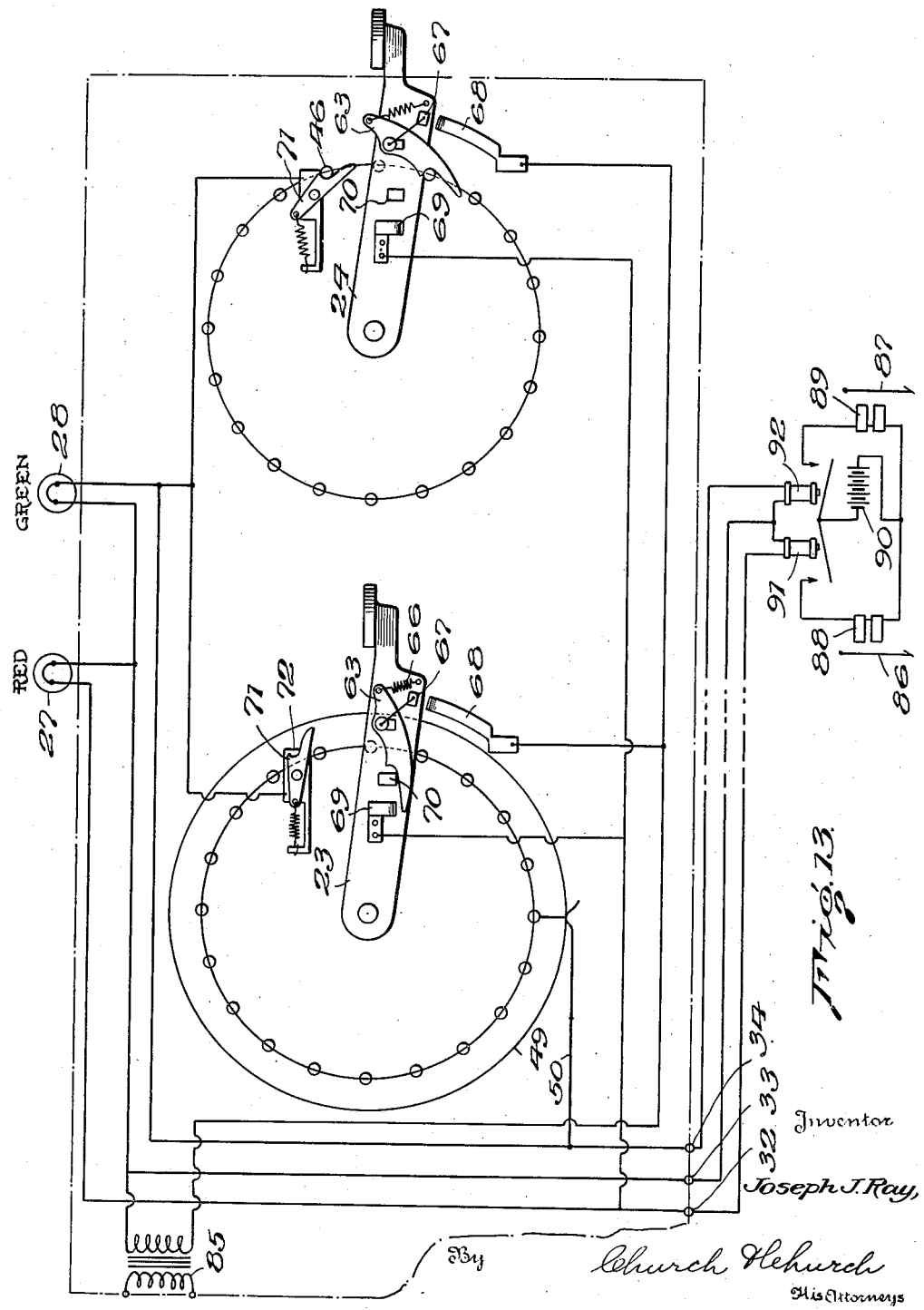

Patented May 2, 1939

2,157,058

UNITED STATES PATENT OFFICE 2,157,058

EDUCATIONAL DEVICE

Joseph J. Ray, Nashville, Tenn.

Application September 2, 1937, Serial No. 162,200

12 Claims. (Cl. 35—22)

The present invention relates to educational devices, and more particularly to devices for conducting psychological tests of the selective reaction of a subject to stimuli, and for teaching various sequences of action of the pupil or subject, such as those known as "mental maze problems".

In general, the device comprises a drum, on which a tape, having thereon a sequence of indicia displays, is detachably wound, there being provided a window, or other registering point, directing attention to one display at a time, and two keys arranged for selective operation by the subject, the structure being such that depression of the correct key will rotate the drum one step to present the succeeding indicia display, but depression of the wrong key will not, and that depression of either key will indicate whether a correct or a wrong selection was made and, preferably, record the number of selections made and whether each was correct or wrong. The device, however, is capable of use for many tests other than that of selection of indicia displays, as for instance the presentation of mental maze problems in which the indicia would be hidden or disregarded, and the subject would have the problem of operating the keys in a stated order such as, for instance, in alternation (R, L, R, L, R ... ) or in double alternation (R, R, L, L, R, R, L, L, R ... ), in which case likewise the drum would be moved only when the correct key is depressed, and similar indication and recording of each key movement would be effected. The device is likewise adapted to be operated by the experimenter that is, the person conducting the test for use as a tachistoscope, to study the range of attention or ability of the subject to distinguish between different indicia at a single impression or in a definite time, in which case the machine would be adjusted for operation by a single key and a metronome or stop watch would be used to facilitate operation at regular time intervals by the person conducting the test, while the responses or reactions by the subject undergoing the test are noted or recorded in any manner desired.

One of the objects of the invention is to provide a testing device of this type that may be adjusted readily to adapt it for conducting many different tests. A further object is to provide such a device that may be adjusted readily for use in teaching a sequence of reactions and presenting maze problems, and for use as a tachistoscope. A still further object is to provide such a device in which each correct and each wrong reaction of the subject is indicated and recorded. A still further object is to provide such a device that is of simple construction, that may be manufactured economically, but is capable of withstanding the rough usage incident to operation by children. Still further objects are to provide a device of this type that may be altered easily and in a minimum of time to substitute a new series of indicia displays, or to adapt it for a different test or use.

Further objects of the invention and uses of the device will be apparent from the following specification, when read in conjunction with the accompanying drawings, in which one specific embodiment of the invention is illustrated and in which:

Figure 1 is a view in perspective of a device embodying the invention;

Fig. 2 is a view in vertical, longitudinal section, taken on line 2—2 of Fig. 1;

Fig. 4 is a view in vertical, transverse section taken on line 4—4 of Fig. 1;

Fig. 7 is an enlarged view in perspective of one of the operating levers, showing the electric contact members;

Fig. 8 is a fragmentary view in front elevation, partly in section, showing the relation of one of the operating levers to the drum;

Fig. 9 is a detail view in section taken on line 9—9 of Fig. 7;

Fig. 13 is a schematic wiring diagram of the device and the polygraph or other device used to record the reactions of the subject.

Figure 3:
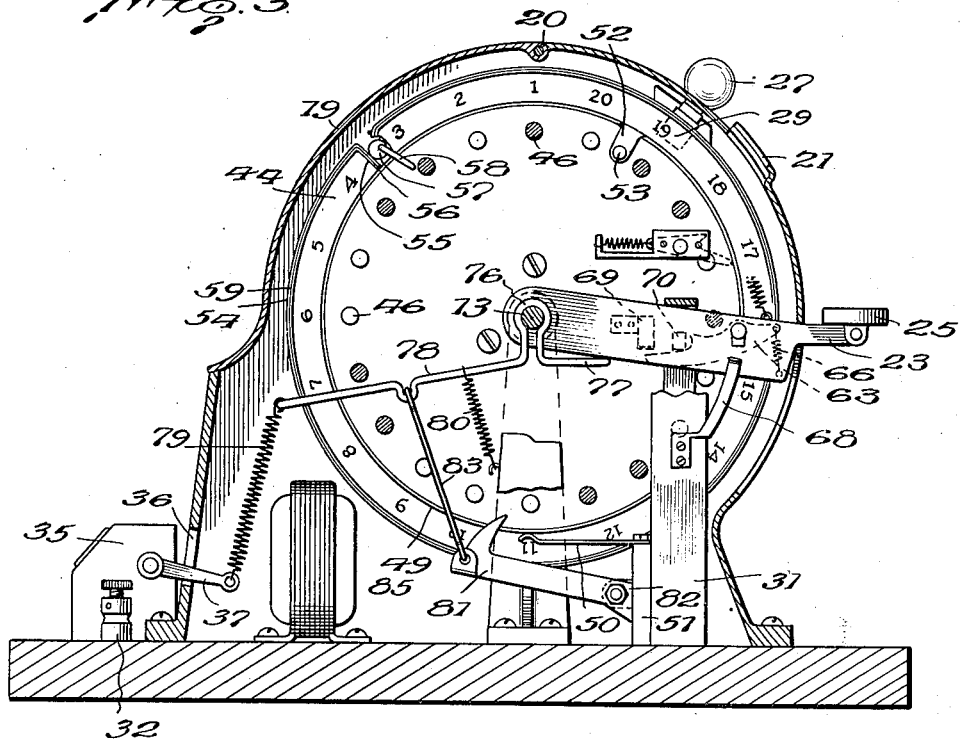
Fig. 3 is a view in vertical, transverse section taken on line 3—3 of Fig. 1.

As shown in Figs. 1 and 2, a base 11 is provided with uprights 12, in which a shaft 13 is mounted to support for rotation a drum 14 that is fixed to the shaft. A casing 15 is secured to the base 11, and houses the drum, the shaft 13 having secured thereto at one end an operating knob 16 and at its other end a pointer or indicator 17 adapted to register with one of a series of consecutive numbers, at 18, on the wall of the casing 15 to indicate at all times the relative rotary position of the drum.

The rear portion 19 of the top wall of the casing 15 is separate from the rest of the casing and hinged thereto at 20, so that it can be swung upwardly to permit access to the drum for replacing the strip of indicia displays and for adjusting the pins of the drum. In the front wall of the casing 15 a window 21 is provided through which one of the series of indicia displays may be seen at each set position of the drum. Beneath the window 21, vertical slots 22 are provided through which project operating levers 23 and 24, having keys 25 and 26, respectively, on their outer ends. The casing 15 is also provided with openings to receive two small electric incandescent lamps 27 and 28, preferably colored red and green, respectively, to indicate "wrong" and "correct" reaction, such lamps being preferably insertable from the outside of the casing into lamp bases 29 and 30 that are mounted on standards 31 carried by the base 11 at each side of the drum 14 and spaced laterally therefrom. The casing 15, together with the hinged portion 19 thereof, may be formed of metal or of suitable moulded material, and it will be apparent that, if desired, it may be formed integrally with the base 11. At the rear of the casing 15, binding posts 32, 33 and 34 are provided for connection to a recording device, as will be later described, and a counting device 35 is likewise provided, preferably outside of the casing, a slot 36 being provided in the casing to accommodate its operating arm 37.

The drum 14, as shown in Fig. 2, is built up of small inner discs 38 and 39, having a spacing member 40 between them, large discs 41 and 42, spaced from the inner discs by spacers 43, and small outer discs 44, engaging the outer faces of the large discs, the entire assembly being clamped together by circumferentially spaced bolts 45. Twenty axially adjustable metal pins 46 extend through the discs of the drum parallel to its axis, such pins being all at the same radial distance from the axis of the drum and equally spaced circumferentially about such axis. Each of the pins 46 is preferably provided with two shallow annular grooves 47, as shown in Fig. 2, and a closely wound coil spring 48 extends about the entire series of pins 46 between the inner discs 38 and 39, establishing electrical connection between them, and engaging in one or the other annular groove 47 of each pin to hold it yieldingly in its adjusted position. Normally, one end of each pin is approximately flush with one outer face of the drum, its other end protruding from the other face of the drum, as shown in Fig. 2, but it will be apparent that each pin may readily be forced axially so as to protrude from either the right-hand face or the left-hand face of the drum, as desired.

Figures 5, 6:
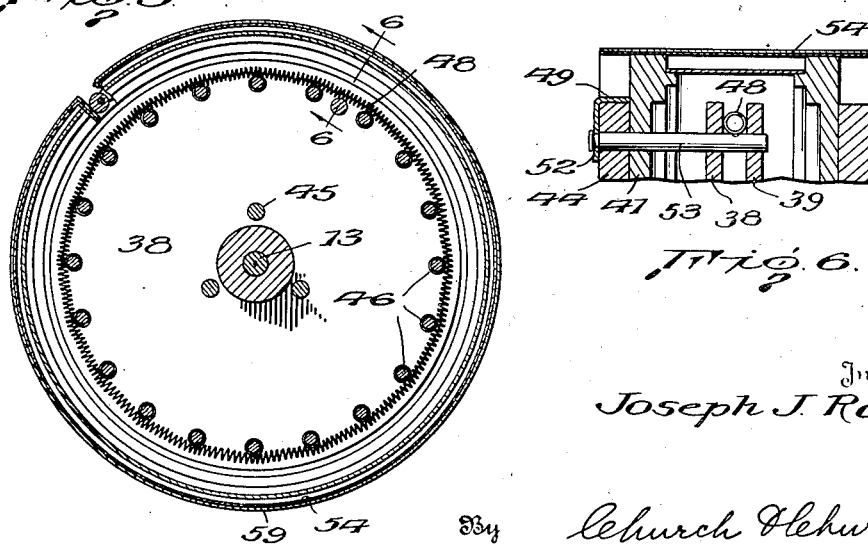
Fig. 5 is a view in vertical, transverse section of the drum shown in Figs. 2 and 3, and taken on line 5—5 of Fig. 2.
Fig. 6 is an enlarged, fragmentary, sectional view taken on line 6—6 of Fig. 5 and showing a detail of the drum construction.

A metallic ring 49 is provided on the periphery of the left outer disc 44 of the drum, for constant engagement with a spring contact member 50, as shown in Fig. 3, mounted on a cross piece 51 that extends between the standards 31, the ring 49 having an extension 52, shown in Figs. 3 and 6, that engages against the outer face of the disc 44 and is electrically connected to the spring 48, and thereby to all of the pins 46, by a rivet 53, as shown in Figs. 5 and 6.

A strip 54, of stiff paper, or other suitable material, bearing a series of pairs of display indicia is wound upon the periphery of the drum 14, being supported on the peripheries of the large discs 41 and 42; and detachably secured in place by any suitable means. As shown in Fig. 3, the discs 41 and 42 are provided with radially-extending alined grooves 55 into which bent ends 56 of the strip 54 are engaged and secured by an eccentrically mounted cam 57 having a short handle 58 by which it may be rotated to and from clamping position. The strip 54 is preferably provided with a protecting cover strip 59 of durable transparent material, such as Cellophane, it being apparent that such cover strip 59 is formed with suitable bent end portions 56 to be engaged and clamped in the grooves 55 and that, if desired, the bent ends may be omitted from the strip 54, as it will be held in place by the cover strip. As indicated in Fig. 3, the numbers "1" to "20" are preferably provided on the face of the disc 41 to indicate the number of each pin 46, that is, the number of the display indicia to which each pin corresponds.

Figures 10, 11, 12:
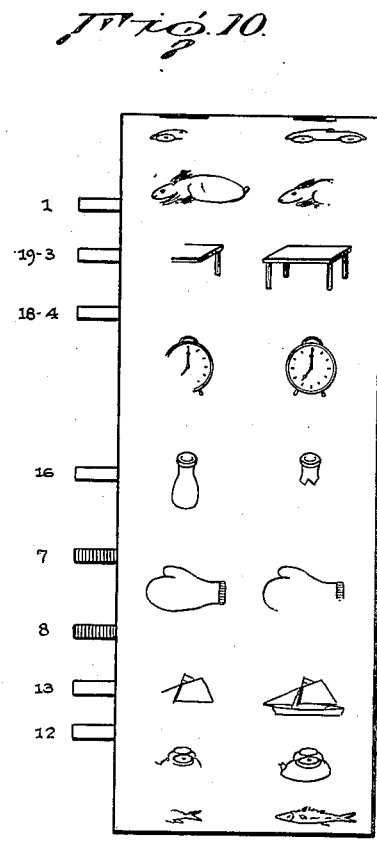
Fig. 10 is an enlarged view in front elevation of the drum in the position shown in Figs. 3 and 4, and showing the adjustable pins of the rear half of the drum shaded, to distinguish from those of the front half thereof.
Fig. 11 is a reduced view of the series of indicia displays, adapted to be wound about the drum.
Fig. 12 is a view, similar to Fig. 11, showing another series of indicia displays.

The particular series of display indicia shown on the strip 54 in Figs. 1, 10 and 11, constitute twenty pairs of representations, one complete and one incomplete, of well-known objects, such as a moon, a key, a house, a spoon, etc. In Fig. 12 there is illustrated a strip 60 having thereon a series of pairs of simple figures, numbers and lines, those of each pair being substantially identical, but with one formed entirely of straight lines, whereas the other includes one or more curved lines. It will be apparent that similar series of display indicia may be used as to which the subject is expected, instead of selecting between "complete" and "incomplete", or between "including a curved line" and "not including a curved line", to select in a series of displays which one of each pair of indicia represents an object of a particular class, such as a vegetable, or a series in which one of each pair is of a particular color, or a series in which one of each pair of numbers is an even number while the other is an odd number.

As shown best in Figs. 7 and 8, the lever 23 is guided by the standard 31, both the lever and the standard being spaced laterally from the drum 14, it being understood that the lever 24 and the other standard 31 are similarly spaced from the other end face of the drum, and carry similar operating and contact devices on their inner faces for cooperation with the drum.

A guide member 61 is secured at its ends to the standard 31 and, with the standard prevents lateral movement of the lever 23 and determines the upper and lower limits of its movement, a tension spring 62 being connected between the lever and the standard to hold the lever normally in its upper position. An operating pawl 63, having a notch 64 for engagement with pins 46, is pivoted on a stud 65 carried by the lever, and a tension spring 66 is connected to the lever 23 and to a rearwardly extending arm of the pawl to swing it counter-clockwise as viewed in Fig. 7. The stud 65 extends through the lever 23 and carries a contact 67 on the opposite side adapted to engage with an arcuate spring contact 68, carried by the standard 31, that is connected to a suitable source of electric energy, such as a transformer. A contact 69 is likewise fixed on the lever 23 in position to be engaged by the end of the pawl 63, and a lug 70 is formed on the guide member 61 to provide an abutment that holds the pawl 63 spaced slightly from the contact 69 when the lever is in its uppermost position. The parts are so located that, as the lever 23 is moved downward slightly from the position shown in Fig. 7, and the stud 65 moves downward, the pawl 63 will be rocked by the spring 66 into engagement with the contact 69. The contact 67 on the lever is likewise spaced slightly above the fixed spring contact 68, so that a slight movement of the lever 23 from its uppermost position is necessary before current can reach the pawl 63. As will later appear, the movement of the lever 23, when its pawl 63 is in the position shown in Fig. 7, is a "wrong" reaction, and a slight movement thereof conducts current from spring contact 68 to contact 67, pawl 63, contact 69 and thence to the red lamp 27 and to a registering device, and movement of the lever, even if completed, will not effect rotation of the drum 14.

Each of the standards 31 carries on its inner face, adjacent the drum 14, a dog 71 having a notch 72 for engagement with the pins 46 and pivoted on a stud 73 on a bracket 74 that is extended rearwardly to support a tension spring 75 connected to the dog 71 to hold it yieldably in the position shown in Fig. 7. As will be evident from Figs. 3, 4 and 13, the pivot points of the pawls 63 are outside of the path of the pins 46, while the pivot points of the dogs 71 are inside of the path of such pins. One or the other of the pawls 63 will always be in engagement with one of the pins 46, while the other is not in engagement with any of the pins. Likewise, one or the other of the dogs 71 will always be in engagement with one of the pins 46 that is spaced circumferentially from that engaged by a pawl 63. The pawls 63 act both as actuating members, cooperating with the pins 46 to impart a step-by-step movement of the drum 14, and also as switches to close a circuit to contact 69 and the red lamp, to indicate a "wrong" reaction, as shown in Fig. 3 or Fig. 7, or to close a circuit to a pin 46 if in the position shown in Fig. 4 and thence to contact ring 49, spring contact 50 and the green lamp to indicate a "correct" reaction. The dogs 71, together, act to prevent reverse rotation of the drum 14 and, since one or the other of them is always in contact with one of the pins 46, they may, if desired, be electrically connected together and to the green lamp, as shown in Fig. 13, in which case the contact ring 49 and its spring contact 50 may be omitted.

In order to register every movement of either lever 23 and 24, a bail 76 is pivoted upon the shaft 13, at each side of the drum 14, having forwardly extending arms 77 bent laterally at their ends to underlie the levers 23 and 24, respectively, and a rearwardly extenning portion or loop comprising arm portions 78 spaced laterally from the drum and connected together by a portion spaced from the rear of the drum and connected by a spring 79, or other suitable means, to the arm 37 of the counting device 35. A spring 80 connecting one of the rear arm portions 78 and one of the standards 12 serves to return the bail 76 and the arm 37 to their normal position shown in Fig. 3.

In order to limit the movement of the drum 14 to a single step, regardless of how rapidly either of the keys 25 or 26 is depressed, dogs 81 are pivoted, at each side of the drum 14, to the cross bar 51, at 82, and are connected by links 83 to the rear arms 78 of the bail 76, such dogs each having a tooth 84 adapted to be moved into the path of the pins 46 whenever either arm 23 or 24 is depressed. It will be apparent that one or the other of the teeth 84 will engage one of the pins 46 and limit the rotative movement of the drum to that of the angular spacing of successive pins.

The wires connecting the various contacts have been omitted, for the sake of clearness, and such connections are clearly and completely shown in Fig. 13. A step-down transformer 85 is preferably located within the casing 15, under the rear portion of the drum 14, as shown in Fig. 3, and provided with suitable connection to the usual housewiring circuits, since it is desirable to use a low voltage in order to utilize inexpensive lamps and to minimize sparking and the danger of injuring or scaring those operating the device. One side of the secondary winding of the transformer is connected to the spring contacts 68, and it will be apparent that no circuit will be closed until one of the levers 23 and 24 is moved to engage its contact 67 with spring contact 68. The other side of the secondary winding of the transformer is connected to the lamp bases 29 and 30, and to the middle binding post 33. The other side of the red lamp 27 is connected to the contacts 69 on the levers 23 and 24, and to binding post 32 to indicate and register a "wrong" reaction, as previously explained. The other side of the green lamp 28 is connected to spring contact 50 and contact ring 49, or to dogs 71, or both, as previously explained, and to binding post 34, to indicate a "correct" reaction.

For registering the "wrong" and "correct" reactions any suitable recording instrument may be used, and the three binding posts 32, 33 and 34 are provided to facilitate connection thereto, 33 being for the common return wire, 32 being used to carry impulses to record "wrong" reactions, and 34 being used to carry impulses to record "correct" reactions. As shown diagrammatically in Fig. 13, the recording device may be a polygraph instrument of well known construction, in which a paper strip is moved at a constant speed, by an electric or spring motor, with scribing pens 86 and 87, for indicating "wrong" and "correct" reactions, respectively, when moved laterally with respect to the tape by electromagnets 88 and 89, respectively, selectively energized by a battery 90, in response to relays 91 and 92, connected to the binding posts 32 and 34, respectively. It will be understood that other recording devices may be used as, for instance, separate electromagnetically-operated counting devices, if it is desired to record only the number of "wrong" and "correct" reactions without identifying which were "wrong" and which were "correct", and without indicating the time spacing of the reactions.

It is believed that the operation and many uses of the device will be apparent, as any series of displays may be made up, economically, and may be readily substituted for that in the device, the pins being moved to project from the right or left side of the drum, to correspond with the right or left position of the display which the subject should select. It is to be noted that the pin numbered 1 is not radially positioned relative to the first display of the tape, but is located three steps in advance of such corresponding "first" display, in order to simplify the lever construction. Such circumferential spacing of each display and its corresponding pin is such that when each display is in sight at the window 21 its pin will be in the position of the pin 46 engaged in notch 64 of pawl 63, as shown in Fig. 4. The numbers on the left disc 44 of the drum 14 are those of the pins 46, and in Figs. 3 and 4 the fifteenth display is at window 21 and the fifteenth pin 46 is in operative position to be engaged by the "correct" lever, which is lever 24.

If it is desired that the subject select the "incomplete" displays of this series each of the pins would be moved to its alternate position. Likewise, the subject may be required to continue the trials until the entire series is completed without an error, the drum being rotated to the starting point by knob 16, to start the series anew, if desired, and the subject may be required to continue the trials until he learns the sequence of operation by rote, that is, until with the displays hidden, as by a card inserted in the window 21, he can complete the series without error. Similarly, regardless of the displays, the pins 46 may be set for many different "maze problems", as stated above, such maze problems being now well recognized in teaching and including alternation (such as R, L, R, L—or R, R, R, L, L, L—etc.), progression (such as R, L, R, L, L, R, L, L, L—or R, L, R, R, L, L, R, R, R—etc.), regression (the opposite of progression), and many others. In general, "maze problem", as used in this specification, may be defined as the problem of discovering that sequence of operations, each of which requires the election of one of two alternatives, which will effect a resultant movement or desired indication in response to each operation of the subject undergoing test. In addition to "maze problems" such as those described above, that is, problems in which the successive operations of the subject correspond to alternation, progression or regression, or otherwise follow some more or less definite system of arrangement, the "maze problems" may be purely arbitrary, (such as R, L, L, L, R, L, R, R, L, R, R, L, L, etc.). In any maze problem, it will be understood that the presence of indicia on the drum, or the lack of indicia, has nothing whatever to do with the use of the device in working out such "maze problems", which indicia if present are preferably hidden from view. If desired, the indicator lights 27 and 28 may be disconnected, when conducting a "maze problem", although such lights are usually of material assistance, both to the subject and to the person conducting the test, as a further indication of whether the "correct" or the "wrong" choice has been made, in addition to the indication afforded by the fact that the drum moved or did not move. It will be appreciated that these "maze problems" are in a sense mental mazes, somewhat similar to a maze of paths such as is commonly termed a "labyrinth", with the distinction that the solution is achieved not by learning a particular course of travel but by learning to carry out a particular sequence of operation of right-hand and left-hand keys.

In the use of color displays, the subject may be required to select that one of each pair of displays of a series of colors which is a particular color, as "red", and the same tape may be used, by inserting a card so as to hide the right or left half of the window 21, and with proper arrangement of the pins 46, to require the subject to press the right-hand key if the color seen is a particular color, for instance, "blue", and the left-hand key if it is "not blue". That is, one key may be used to indicate "yes" and the other key to indicate "no", in response to each display of any desired series.

It will thus be seen that the device may be used in such a way that the keys indicate the position (right or left) of a selected display of a pair, or so that one of the keys indicates "yes" and the other "no" in response to each of a series of single displays in accordance with a question such as "Is it an even number?", or may be used for presentation of a large variety of maze problems, and that the adjustment of the device for any of such uses entails little expense or time. At the same time, the operation of the lights, as well as the rotation or lack of rotation of the drum, assist the subject in learning, and if desired, one or both lights may be readily disconnected to facilitate supervision, while a complete record may readily be made of the time and correctness of each reaction.

It will also be appreciated that the device may be used for tests of many types and varying in difficulty from those for the mental level of young children to those of the mental level of superior adults. As the pointer 17 is adjustably mounted on its shaft, it will be apparent that it may be shifted to a different position relative to the drum to alter a maze problem, particularly when the subject is working on irregular alternation maze problems. It will be understood that, when a "wrong" reaction is made the problem is started anew by rotating the drum until the pointer indicates "1". When it is desired to change the problem, the pointer is shifted to correspond with a different circumferential point of the drum, that is, a different pin 46, as the initial step of the problem. For instance, if the problem has been R, L, L, L, R, L, R, R, etc., and the pointer is moved two steps forward (to 3) when the drum is moved to bring the pointer to the starting point "1" it will correspond with the pin which formerly was the third in the series, and the solution consequently would be L, L, R, L, R, R, etc. While the same result normally would be obtained by adjusting the pins 46, a shift of the pointer 17 can often be utilized to change more quickly from one problem to another.

What I claim is:

1. An educational device for testing the reaction of a subject to each of a series of displays, comprising a body having thereon a series of displays and a series of elements carried by said body and each associated with one of said displays, and two separate means selectively operable by the subject and each including a member movable in a definite path, said elements being adjustable to alternate positions in each of which it is in the path of movement of one or the other of said members.

2. In an educational device, the combination of a carrier having thereon a series of pairs of displays of which one may be considered "correct" and the other "wrong", displays, elements movable with said carrier each associated with one pair of said displays and adjustable to alternate positions to correspond with a "correct" and a "wrong" reaction to its associated display, a pair of selectively operable means each having a member controlled thereby, the member of only that selectively operable means which corresponds to the "correct" position of a given adjustable element being effective to cooperate with said adjustable element to move said carrier.

3. In an educational device, the combination of a carrier having thereon a series of pairs of displays of which one may be considered "correct" and the other "wrong", displays, a pair of keys adapted to be moved by the subject in selective response to said displays, means operable by said keys co-operating with said carrier to impart one step of movement to said carrier only when the key corresponding to the "correct" display of a pair is operated, electrically controlled "correct"

and "wrong" indicating means, and contacts movable with each of said keys to complete circuits to said indicating means in accordance with whether the "correct" or "wrong" operating means is selected.

4. In a testing device, the combination of a body mounted for rotation, a plurality of elements spaced about said body and adjustable relative thereto to either one of two alternate positions, and means for imparting a step-by-step rotary movement to said body comprising selectively operable keys each having a member movable therewith effective to cooperate with one of said elements to rotate said body upon operation of that means which corresponds to the setting of said element 5. In a testing device, the combination of a rotatably mounted body, a pair of selectively operable means each including a pawl member, a plurality of elements carried by said body and adjustable relative thereto into the path of one of said pawl members, a normally open circuit closed by movement of said means and having two branches each including an indicating means, one of said branches including a contact closed upon movement of one of said means when no adjustable element is in the path of its pawl member, and the other of said branches being closed upon movement of said means when one of said adjustable elements is engaged with its pawl member.

6. In a testing device, the combination of a rotatably mounted body, two separate devices selectively operable to effect step-by-step rotation of said body and each including a pawl member, and a plurality of elements carried by said body and adjustable into the path of movement of one or the other of said pawl members.

7. In a testing device, the combination of a rotatably mounted body, two separate devices selectively operable to effect step-by-step rotation of said body each including a movably mounted pawl member, a plurality of elements carried by said body and adjustable into and out of the path of movement of one of said pawl members, two normally open electric circuits each including an indicating means, and means carried by said selectively operable devices effective upon operation of one of said devices to close one or the other of said normally open circuits dependent upon the presence of an element in, or the absence of an element from, the path of movement of the pawl member of the operated device.

8. In a testing device, a rotatably mounted body, a plurality of elements adjustable to alternate positions relative to said body, two selectively operable devices each including a pawl member adapted to cooperate with one of said elements to effect step-by-step rotation of said body when said element is in the path of movement of said pawl member, an indicating means, and a normally open electric circuit including said indicating means and said pawl member and a contact device closed by operation of the selected device.

9. In a testing device, the combination of a rotatably mounted body, a plurality of elements adjustable to alternate positions relative to said body, two selectively operable devices each including a pawl member adapted to cooperate with one of said elements to effect a step of rotation of said body when said element is in the path of movement of said pawl member, an indicating means, a contact, and a normally open electric circuit including said indicating means and said contact and closed upon operation of a selectively operable device, when there is no element in the path of movement of its pawl, by engagement of said pawl with said contact.

10. In a testing device, the combination of a rotatably mounted body, a plurality of pins mounted in said body and adjustable axially thereof to project from one or the other face of said body, selectively operable keys adjacent each face of the body and each having a pawl member in the path of movement of said elements when in projected adjustment, whereby operation of that key having an element in engagement with its pawl member will impart a step of movement to said body and operation of that key having no element in engagement with its pawl member will not effect movement of said body.

11. An educational device for testing the reaction of a subject, comprising a carrier, means detachably mounted on said carrier having thereon a series of pairs of displays of which one may be considered "correct" and the other "wrong", a series of elements on said carrier each associated with a corresponding one of said pairs of displays and adjustable to alternate positions to correspond to the "correct" reaction to its associated pair of displays, and two separate means selectively operable by the subject each including a member effective to cooperate with one of said elements and move said carrier to substitute the next display of the series upon operation, for a particular display, of that means which corresponds to the "correct" position of the element associated with such display.

12. In a testing machine, the combination of a rotatably mounted body means embodying, a series of displays detachably carried by said body, a pair of indicating means, a pair of selectively operable keys, a series of elements carried by said body each associated, respectively, with one of said series of displays and adjustable to either of two positions of which one may be considered a "correct" and the other "wrong", means controlled by the operation of the key corresponding to a "correct" position of an element effective to rotate said body and operate one of said indicating means, and means controlled by the operation of the key corresponding to a "wrong" position of an element effective to operate the other of said indicating means.

JOSEPH J. RAY.